(12) United States Patent
Arya et al.

(10) Patent No.: US 8,486,165 B2
(45) Date of Patent: Jul. 16, 2013

(54) HEAT RECOVERY IN BLACK WATER FLASH SYSTEMS

(75) Inventors: Alay S Arya, Vadodara (IN); Saumar Jyoti Hazarika, Bangalore (IN); Ganesh Arumugam, Bangalore (IN)

(73) Assignee: General Electric Company, Schenectady, NY (US)

( * ) Notice: Subject to any disclaimer, the term of this patent is extended or adjusted under 35 U.S.C. 154(b) by 474 days.

(21) Appl. No.: 12/714,321

(22) Filed: Feb. 26, 2010

(65) Prior Publication Data

US 2011/0209407 A1    Sep. 1, 2011

(51) Int. Cl.
*B01J 7/00*    (2006.01)
*C01B 3/36*    (2006.01)
*B01D 53/14*    (2006.01)
*B01D 19/00*    (2006.01)

(52) U.S. Cl.
USPC ............. 48/61; 48/197 R; 48/210; 95/149; 95/156; 95/172

(58) Field of Classification Search
USPC ............. 48/61, 197 R, 210; 95/156, 172
See application file for complete search history.

(56) References Cited

U.S. PATENT DOCUMENTS

| 3,898,058 A | 8/1975 | McGill |
| 5,415,673 A * | 5/1995 | Hilton et al. ............ 48/197 R |
| 6,036,748 A | 3/2000 | Wallace et al. |
| 2004/0123601 A1 * | 7/2004 | Fan ............................ 60/781 |

* cited by examiner

*Primary Examiner* — Matthew Merkling
(74) *Attorney, Agent, or Firm* — Fletcher Yoder, P.C.

(57) ABSTRACT

In one embodiment, a gasification system includes a black water processing system with flash tanks. The flash tanks may separate gases from black water to produce a first discharge of the black water and another discharge of separated gases. The gasification system also includes a heat exchanger that transfers heat from the discharge of separated gases to a process stream of the gasification system.

19 Claims, 4 Drawing Sheets

HEAT RECOVERY IN BLACK WATER FLASH SYSTEMS

BACKGROUND OF THE INVENTION

The subject matter disclosed herein relates to gasification process plants for chemical production and/or to integrated gasification combined cycle (IGCC) power plants. More specifically, the disclosed embodiments relate to black water processing systems for treating black water produced by gasification.

Fossil fuels, such as coal, coke, or petroleum, may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns more efficiently and cleaner than the fuel in its original state. A byproduct of gasification is black water, which may include particles of ash, metals, ammonia, and organic matter as well as dissolved gases. The black water may be subjected to a flash separation process to separate dissolved gases from the black water. The flash separation process may generate hot vapor streams that may be cooled before further processing.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gasification system includes a first flash tank configured to separate gases from black water to produce a first discharge of the black water and a second discharge of first separated gases. The gasification system also includes a second flash tank disposed downstream of and in series with the first flash tank and configured to separate gases from the black water to produce a third discharge of the black water and a fourth discharge of second separated gases. The gasification system further includes a heat exchanger configured to transfer heat from the fourth discharge to a process stream of the gasification system.

In a second embodiment, a gasification system includes a vacuum flash tank configured to separate gases from black water to produce a first discharge of the black water and a second discharge of separated gases. The gasification system also includes a first heat exchanger configured to transfer heat from the second discharge to a process stream of the gasification system, and a second heat exchanger disposed downstream of the first heat exchanger and configured to transfer heat from the second discharge to a cooling fluid.

In a third embodiment, a gasification system includes a first flash tank configured to separate gases from black water to produce a first discharge of the black water and a second discharge of first separated gases. The gasification system also includes a second flash tank configured to separate the gases from the first discharge to produce a third discharge of the black water and a fourth discharge of second separated gases. The gasification system further includes a vacuum flash tank configured to separate the gases from the third discharge to produce a fifth discharge of the black water and a sixth discharge of third separated gases, and a heat exchanger configured to transfer heat from the fourth discharge to a process stream of the gasification system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gasification systems that recover heat from black water flash separation processes. Black water generally includes quench and/or scrubbing water that contains a relatively large amount of carbon containing solids. Black water may be produced as a byproduct of gasification and may include dissolved gases that should be separated from the black water prior to discharge of the black water from the gasification system. To separate the dissolved gases, the black water may be subjected to a flash separation process where the dissolved gases are separated from the black water and discharged as hot overhead vapor streams.

The gasification systems described herein employ heat exchangers that may recover heat from the hot overhead vapor streams and transfer the heat to one or more process streams within the gasification system. For example, the heat from the hot overhead vapor streams may be employed to heat a fuel slurry before the fuel slurry enters a gasifier and/or to heat grey water that may be recycled within the gasification system. The recovery of heat from the hot overhead vapor streams may allow higher temperatures to be achieved in the process streams, which may improve the efficiency of the gasification system. Further, as the hot overhead vapor streams transfer heat to the process streams, the hot overhead vapor streams may be cooled, which may reduce the load on a cooling tower that cools the hot overhead vapor streams.

Figure 1:
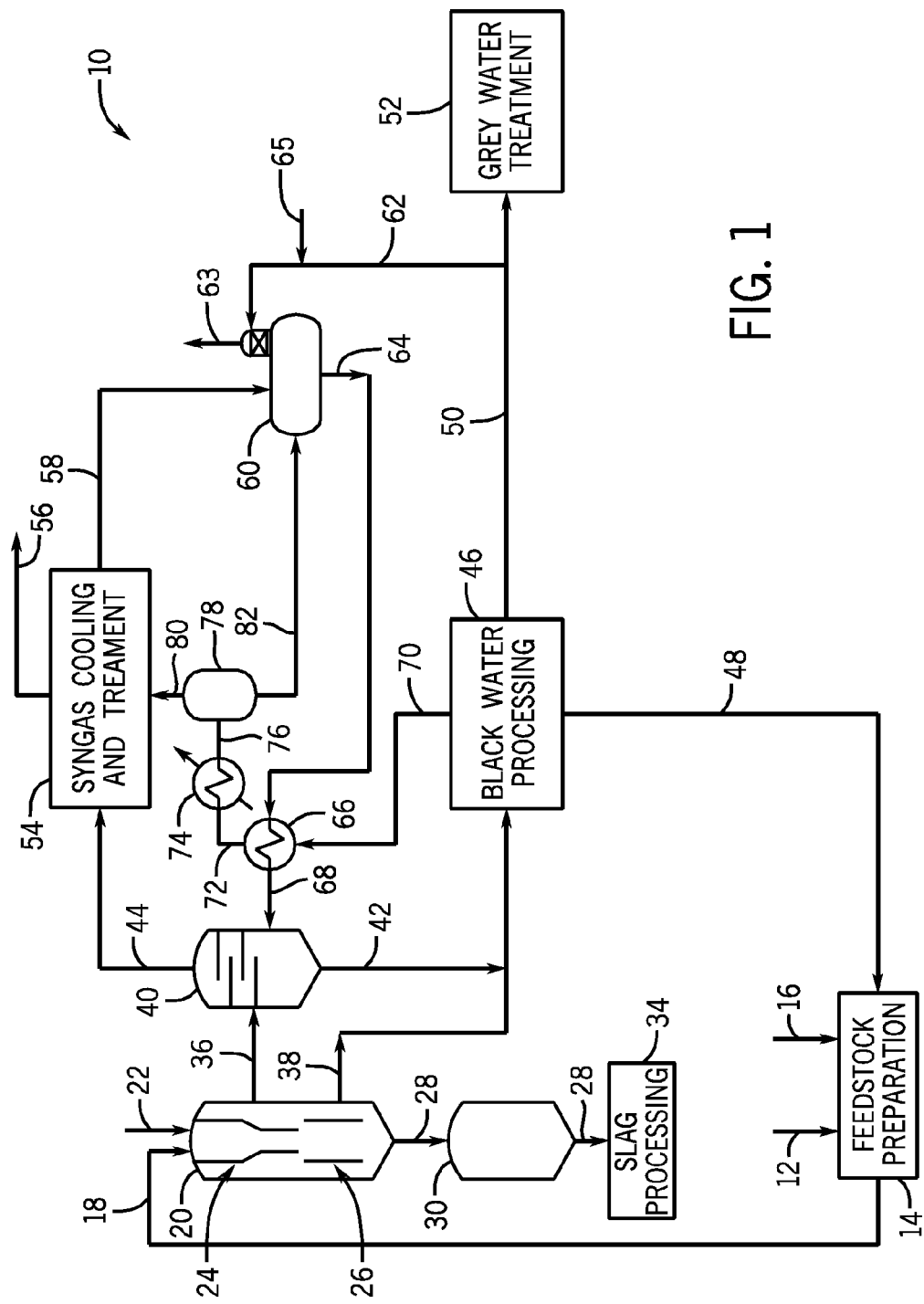
FIG. 1 is a schematic block diagram of an embodiment of a gasification system.

FIG. 1 illustrates a gasification system 10 that may recover heat from a black water flash separation process. Within the gasification system 10, a carbonaceous fuel source 12 may be utilized as a source of energy to produce syngas. The fuel source 12 may include coal, petroleum coke, biomass, wood-based materials, agricultural wastes, tars, coke oven gas and asphalt, or other carbon containing materials.

The fuel source 12 may be introduced into the gasification system 10 via a feedstock preparation system 14. The feedstock preparation system 14 may resize or reshape the fuel source 12, for example, by chopping, milling, shredding, pulverizing, briquetting, or palletizing the fuel source 12 to create a fuel slurry 18. According to certain embodiments, the feedstock preparation system 14 may include a grinding mill. Further, within the feedstock preparation system 14, additives, 16, such as water, or other suitable liquids, may be added to the fuel source 12 to create the fuel slurry 18. However, in other embodiments, where no liquid additives are employed, the fuel slurry 18 may be a dry feedstock.

The fuel slurry 18 may be directed to a gasifier 20 where the fuel slurry 18 may be mixed with oxygen 22 and steam to produce syngas. In particular, the fuel slurry 18 may be reacted with a limited amount of oxygen (e.g., partial oxidation) at elevated pressures (e.g. from absolute pressures of approximately 20 bar to 85 bar) and temperatures (e.g., approximately 700° C. to 1600° C.) to partially oxidize the fuel slurry 18 and produce syngas. Due to chemical reactions between the oxygen 22, steam, and carbon within the fuel slurry 18, the syngas may include hydrogen, carbon monoxide, and carbon dioxide, as well as other less desirable components, such as ash, sulfur, nitrogen, and chloride, present in the carbonaceous fuel.

The gasifier 20 may include a reaction portion 24 where partial oxidation may occur and a quench portion 26 where cooling may occur. Within the reaction portion 24, the fuel slurry 18 may be heated to undergo a pyrolysis process. According to certain embodiments, temperatures inside the gasifier 20 may range from approximately 150° C. to 700° C. during the pyrolysis process, depending on the type of fuel source 12 utilized to generate the fuel slurry 18. The heating of the feedstock during the pyrolysis process may generate a solid, e.g., char, and residue gases, e.g., carbon monoxide, and hydrogen.

A combustion process may then occur in the gasifier 20. The combustion may include introducing oxygen to the char and residue gases. The char and residue gases may react with the oxygen to form carbon dioxide and carbon monoxide, which provides heat for the subsequent gasification reactions. According to certain embodiments, temperatures during the combustion process may range from approximately 700° C. to 1600° C. Next, steam may be introduced into the gasifier 20 during a gasification step. The char may react with the carbon dioxide and steam to produce carbon monoxide and hydrogen at temperatures ranging from approximately 800° C. to 1100° C. In essence, the gasifier 20 utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 20. This resultant gas may include approximately 85% of carbon monoxide and hydrogen, as well as methane, carbon dioxide, water, hydrogen chloride, hydrogen fluoride, carbonyl sulfide, ammonia, hydrogen cyanide, and hydrogen sulfide (depending on the sulfur content of the feedstock). Non-gasifiable ash material and unconverted and/or incompletely converted fuel slurry may be byproducts of the process that may exist as larger particles of molten slag and smaller particles, referred to as fines.

From the reaction portion 24, the syngas may enter the quench portion 26 where the syngas may be cooled and saturated. The quench portion 26 may be an integral part of the gasifier 20 as shown, or the quench portion 26 may be a separate unit. The quench portion 26 may cool the syngas to at or near a saturation temperature through evaporation of a cooling fluid, such as water, causing less desirable components to solidify. In particular, the molten slag may be rapidly cooled and solidified into coarse slag particles 28 that may be collected in the bottom of the quench portion 26.

The coarse slag 28 may flow, for example, by gravity, from the quench portion 26 into a pressurized lock hopper 30 at regular intervals. In certain embodiments, liquid, such as water may be removed from the coarse slag 28 within the lock hopper 30 and returned to the gasifier 20. The coarse slag 28 may then be removed form the lock hopper 30 and directed to a slag processing system 34 where the slag 28 may be screened to reduce moisture and then directed to an offsite disposal facility. For example, the slag 28 may be used as road base or as another building material. According to certain embodiments, the slag processing system 34 may include a drag conveyer and/or a slag sump.

In addition to producing slag 28, the quench portion 26 may produce cooled syngas 36 and black water 38, which includes fine particles of slag produced by the gasifier 20. The cooled syngas 36 may be directed to a scrubber 40 where additional fines and other entrained gases, such as hydrogen chloride, may be removed. In particular, within the scrubber 40, the fines may be separated from the syngas to produce another stream of black water 42 that may exit a bottom portion of the scrubber 40 while scrubbed syngas 44 may exit through an upper portion of the scrubber 40.

The black water 42 exiting the bottom portion of the scrubber 40 may be combined with the black water 38 from the gasifier 20 and may be directed to a black water processing system 46. In other embodiments, the black water 38 and the black water 42 may be provided to the black water processing system 46 as separate streams. As described further with respect to FIG. 2, the black water processing system 46 may include a series of flash tanks that subject the black water 38 and 42 to a series of pressure reductions to remove dissolved gases and concentrate the fines. Heat from the flash tanks may be recovered and used to heat other streams within the gasification system 10, as described further with respect to FIG. 2.

The black water processing system 48 also may include a settling process that produces separated fines 48 and grey water 50. The separated fines 48 may be recycled to the feed stock preparation system 14 where the fines may be used to provide additional fuel. The grey water 50 may be directed to a grey water treatment system 52 where the grey water 50 may undergo further processing to remove gases, such as ammonia, and solids.

After the additional black water 42 has been removed in the scrubber 40, the scrubbed syngas 44 may be directed to a syngas cooling and treatment system 54 where the syngas may be further purified to produce sweetened syngas 56. According to certain embodiments, the syngas cooling and treatment system 54 may include one or more water gas shift reactors that adjust the ratio of hydrogen to carbon monoxide in the scrubbed syngas 44. Further, the syngas cooling and treatment system 54 may include one or more acid gas removal processes that may remove acid gases, such as hydrogen sulfide, hydrogen chloride, and hydrogen fluoride, among others. Further, the syngas cooling and treatment system 54 may include one or more stripping processes for removing ammonia. Moreover, a tail gas treatment process also may be included to remove residual gas components such as ammonia, methanol, or any residual chemicals from upstream processing, such as from a sulfur recovery unit. The sweetened syngas 56 may then be used for a variety of processes such as chemical processing or power generation.

The syngas cooling and treatment system 54 also may produce liquid 58 that may be used to facilitate deaeration within a deaerator 60. In particular, a portion 62 of the grey water 50 may be directed to the deaerator 60 to remove oxygen 63 and other dissolved gases that may cause corrosion in downstream components. Makeup water 65 may be added to the portion 62 of the grey water 50 directed to the deaerator 60 to provide additional liquid for the deaerator 60. The deaerator 60 may produce deaerated grey water 64 that may be heated within a heat exchanger 66 and directed to the scrubber 40 as heated grey water 68. The heat exchanger 66 may transfer heat to the deaerated grey water 64 using vapor 70 from the black water processing system 46. In particular, the vapor 70 may be directed through the heat exchanger 66 to transfer heat to the deaerated grey water 64 producing cooled vapor 72. The cooled vapor 72 may be further condensed within a condenser 74 to produce partially condensed vapor 76. The partially condensed vapor 76 may be directed to a knock out vessel 78 to separate the vapor 80 from liquid components 82, such as water. The vapor 80 from the knock out vessel 78 may be provided to the syngas cooling and treatment system 54 to assist with certain processes, such as ammonia stripping. The liquid 82 from the knock out vessel 78 may be directed to the deaerator 60 to facilitate deaeration.

In general, heat from the black water processing system 46 may be recovered and used to heat other streams within the gasification system 10. For example, as described further below with respect to FIG. 2, heat recovered from the black water processing system 46 may be used to heat fuel slurry 18, makeup water 65, grey water 62, and/or separated fines 48.

Figure 2:
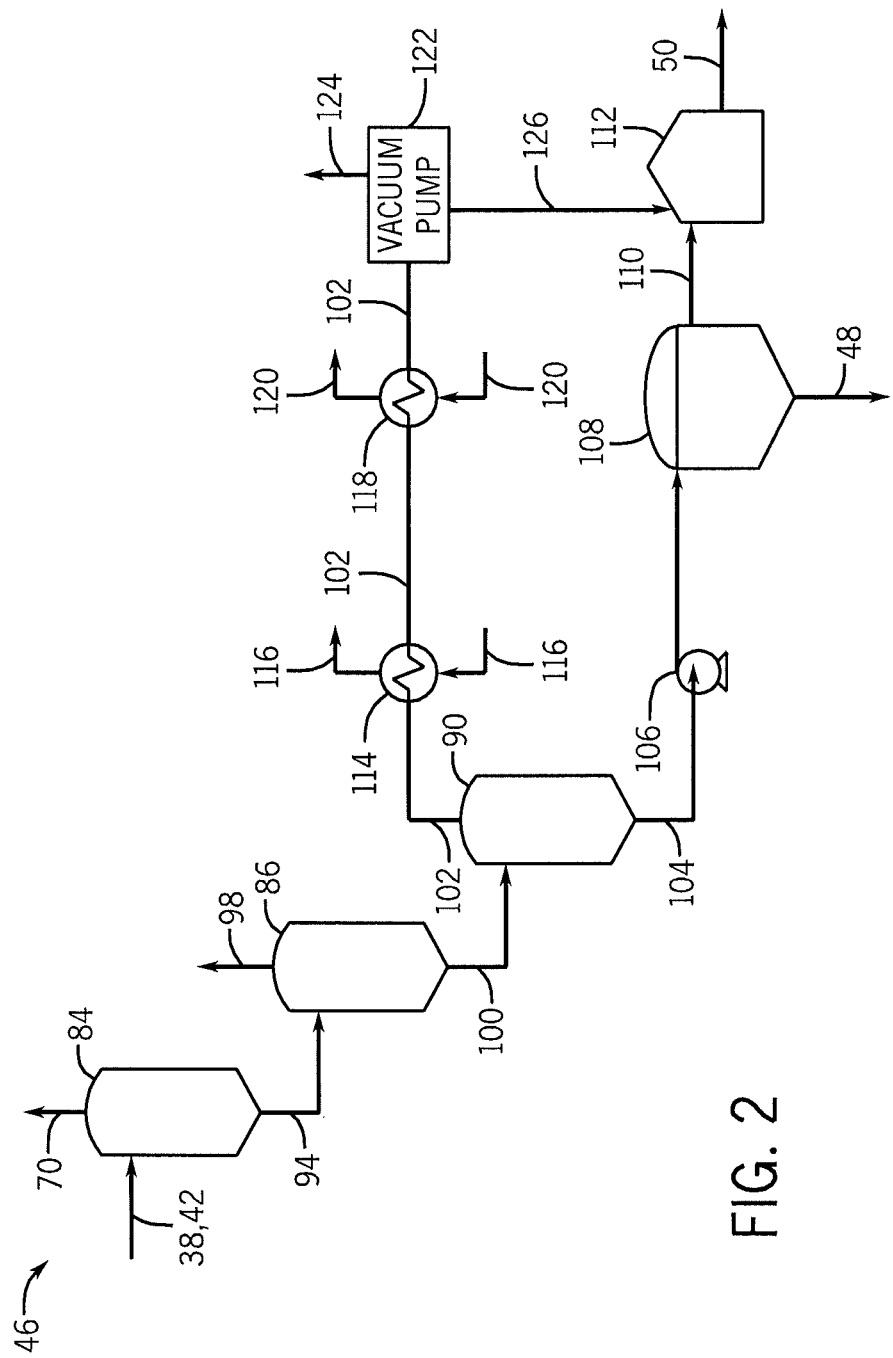
FIG. 2 is a schematic block diagram of an embodiment of the black water processing system of FIG. 1.

FIG. 2 depicts an embodiment of the black water processing system 46 of FIG. 1 that may recover heat from a flash separation process and transfer the heat to other areas of the gasification system 10. The black water processing system 46 includes three flash tanks 84, 86, and 90 arranged in series. Although three flash tanks are shown, in other embodiments any number of flash tanks may be employed. Each flash tank 84, 86, and 90 may promote separation of fines through a reduction in pressure that causes the black water to be partially evaporated and cooled, thereby separating dissolved gases from the fines. In particular, each flash tank 84, 86, and 90 may subject the black water 38 and 42 to a progressively lower pressure, thereby facilitating further removal of dissolved gases at each flash tank 84, 86, and 90. According to certain embodiments, the dissolved gases may include syngas, which may be recovered through the syngas cooling and treatment system 54 (FIG. 1).

The black water 38 and 42 may enter the black water processing system 46 through the high-pressure flash tank 84. According to certain embodiments, the high-pressure flash tank 84 may operate at a pressure of at least approximately 10 bar. However, in other embodiments, the high-pressure flash tank 84 may operate at any suitable pressure. Within the high-pressure flash tank 84, the vapor components (e.g., the separated gases) may be discharged as overhead vapor 70 through a top portion while a liquid discharge 94 of black water concentrated with fines may exit through a bottom portion. The overhead vapor 70 may be directed through the heat exchanger 66 shown in FIG. 1 to heat the grey water 64 before the grey water 64 enters the scrubber 40.

The liquid discharge 94 from the high-pressure flash tank 84 may enter the low-pressure flash tank 86 where further separation of the vapor and liquid components may occur. In particular, the vapor components may be discharged as overhead vapor 98 through a top portion of the low-pressure flash tank 86 while a liquid discharge 100 of black water concentrated with fines may exit through a bottom portion. In certain embodiments, the overhead vapor 98 may be directed to the deaerator 60 (FIG. 1) to provide heat for the deaeration process. According to certain embodiments, the low-pressure flash tank 86 may operate at a pressure of approximately 2 bar. However, in other embodiments, the low-pressure flash tank 86 may operate as more of an intermediate-pressure flash tank with a pressure of approximately 2 to 10 bar.

The liquid discharge 100 from the low-pressure flash tank 86 may enter the vacuum flash tank 90 where additional separation of the vapor and liquid components may occur. In particular, the vapor components may be discharged as overhead vapor 102 through a top portion of the vacuum flash tank 90 while a liquid discharge 104 of black water concentrated with fines may exit through a bottom portion. According to certain embodiments, the vacuum flash tank 90 may operate at an absolute pressure less than approximately 0.5 bar. The liquid discharge 104 may be directed through a pump 106 to a settling tank 108. Within the settling tank 108, the fines 48 may be separated and provided to the feedstock preparation system 14 for fuel, as described above with respect to FIG. 1. The remaining liquid 110 and any entrained vapor may be directed to a grey water tank 112 for storage of the grey water 50 prior to direction to the grey water treatment system 52 (FIG. 1). In certain embodiments, the grey water tank 112 may include a motive device for circulating suspended particles and also may serve to regulate flow to the grey water treatment system 52.

The overhead vapor 102 from the vacuum flash tank 90 may flow through a heat exchanger 114 to heat a process stream 116. In particular, as the vapor 102 flows through the heat exchanger 114, the hot vapor 102 may transfer heat to the process stream 116 flowing through the heat exchanger 114. The process stream 116 may be any suitable stream included within the gasification system 10. For example, as shown in FIG. 1, the process stream 116 may be the makeup water 65 provided to the deaerator 60 shown in FIG. 1. In another example, the process stream 116 may be the portion 62 of the grey water 50 that is directed to the deaerator 60. In yet another example, the process stream 116 may be the fuel slurry 18 that is directed to the gasifier 20. In one more example, the process stream 116 may be the separated fines 48 that are provided to the feedstock preparation system 14. According to certain embodiments, the process stream 116 may be heated by at least approximately 5, 10, 15, or 20° C. Moreover, the process stream 116 may be heated by at least approximately 5 to 50° C., and all subranges therebetween.

As the overhead vapor 102 flows through the heat exchanger 114, the overhead vapor 102 may be cooled. According to certain embodiments, the overhead vapor 102 may be cooled by at least approximately 1 to 10° C., and all subranges therebetween. The overhead vapor 102 exiting the heat exchanger 114 may then flow through another heat exchanger 118 where the overhead vapor 102 may be further cooled and/or condensed by cooling water 120 flowing through the heat exchanger 118. According to certain embodiments, the cooling water 120 may be circulated between the heat exchanger 118 and a cooling tower included within the gasification system 10.

The overhead vapor 102 exiting the heat exchanger 118 may then be provided to a vacuum pump 122. The vacuum pump 122 may include equipment such as pumps, knock out tanks, and heat exchangers that may produce a vacuum in the vacuum flash tank 90. According to certain embodiments, the vacuum pump system 122 may include a liquid ring vacuum pump that may be employed to create the vacuum within the vacuum flash tank 90. The vacuum pump system 122 also may include one or more knock out tanks that separate vapor 124 from liquid 126. The vapor 124 may exit the vacuum pump system 122 and may be released to the atmosphere or may directed to an ammonia stripper for further treatment. The liquid 126 may exit the vacuum pump system 122 and may be provided to the grey water tank 112 for further treatment in the grey water treatment system 56 (FIG. 1).

The inclusion of the heat exchanger 114 within the black water processing system 46 may allow heat from the overhead vapor 102 to be transferred to another process steam 116 within the gasification system 10. The transfer of heat may allow the overhead vapor 102 to be partially cooled before entering the heat exchanger 118 circulating the cooling water 120. Accordingly, the overhead vapor 102 may enter the heat exchanger 118 at a lower temperature, which, in turn, may reduce the load on the cooling tower 120. According to certain embodiments, the cooling of the overhead vapor 102 in the heat exchanger 114 upstream of the heat exchanger 118 may reduce the circulation of the cooling water by approximately 50,000 to 500,000 pounds per hour, and all subranges therebetween. Further, according to certain embodiments, the load on the cooling tower 120 may be reduced by approximately 1 to 35 percent, and all subranges therebetween.

The transfer of heat from the overhead vapor 102 to the process stream 116 may allow heat to be recovered from the black water processing system 46 and employed in other areas of the gasification system 10. According to certain embodiments, approximately 1 to 20 MMBtu/h of heat may be recovered from the overhead vapor 102 and transferred to the process stream 116 through the heat exchanger 114. Further, the use of the heat from the overhead vapor 102 in other areas of the gasification system 10 may lead to reduced energy consumption and/or increased efficiency in other areas of the gasification system 10.

For example, in embodiments where the process stream 116 is the makeup water 65 provided to the deaerator 60 (FIG. 1), the makeup water 65 may be preheated before entering the deaerator 60. According to certain embodiments, the makeup water 65 may be heated by approximately 20° C. as the makeup water 65 flows through the heat exchanger 114. The higher temperature makeup water 65 entering the deaerator 60 may allow less steam to be used in the deaerator 60. According to certain embodiments, the preheating of the makeup water 65 in the heat exchanger 114 may reduce the steam consumption in the deaerator 60 by approximately 4000-6000 pounds per hour. Further, according to certain embodiments, the preheating of the makeup water 65 in the heat exchanger 114 may reduce the steam consumption in the deaerator 60 by approximately 1 to 20 percent, and all subranges therebetween.

In another embodiment, the process stream 116 may be the portion 62 of the grey water 50 that is recycled to the deaerator 60 within the gasification system 10. In this embodiment, the grey water portion 62 may be heated by approximately 15° C. as the grey water portion 62 flows through the heat exchanger 114. The higher temperature grey water portion 62 entering the deaerator 60 may allow less steam to be used in the deaerator 60. According to certain embodiments, the preheating of the grey water portion 62 may reduce the steam consumption in the deaerator 60 by approximately 5000-8,000 pounds per hour. Further, according to certain embodiments, the preheating of the grey water portion 62 may reduce the steam consumption in the deaerator 60 by approximately 20 to 70 percent, and all subranges therebetween.

In another embodiment, the process stream 116 may be the fuel slurry 18 provided to the gasifier 20. In this embodiment, the fuel slurry 18 may be directed through the heat exchanger 114 where the fuel slurry 18 may be heated by approximately 30° C. The preheating of the fuel slurry 18 may increase the temperature of the fuel slurry 18 entering the gasifier 20 which may increase the cold gas efficiency of the gasification process and may decrease consumption of the oxygen 22.

In yet another embodiment, the process stream 116 may be the stream of separated fines 48 that is recycled to the feedstock preparation system 14. In these embodiments, the stream of separated fines 48 may be directed through the heat exchanger 114 to heat the stream of separated fines 48 by approximately 50° C. The increased temperature of the stream of separated fines 48 also may increase the cold gas efficiency of the gasification process and may decrease the consumption of oxygen 22 in the gasifier 20.

In other embodiments, the number and/or the types of flash tanks 84, 86, and 90 included in the black water processing system 46 may vary. For example, in certain embodiments, four flash tanks (e.g., a high-pressure flash tank, a low-pressure or intermediate-pressure flash tank, and two vacuum flash tanks) may be included. In another example, the black water processing system 46 may include a high-pressure flash tank, an intermediate-pressure flash tank, a low-pressure flash tank, and a vacuum flash tank. Moreover, multiple heat exchangers in series and/or in parallel may be employed to transfer heat from the overhead vapor 102 to the process stream 116. Further, additional equipment, such as pumps, valves, temperature sensors, and pressure transducers, among others, may be included.

Figure 3:
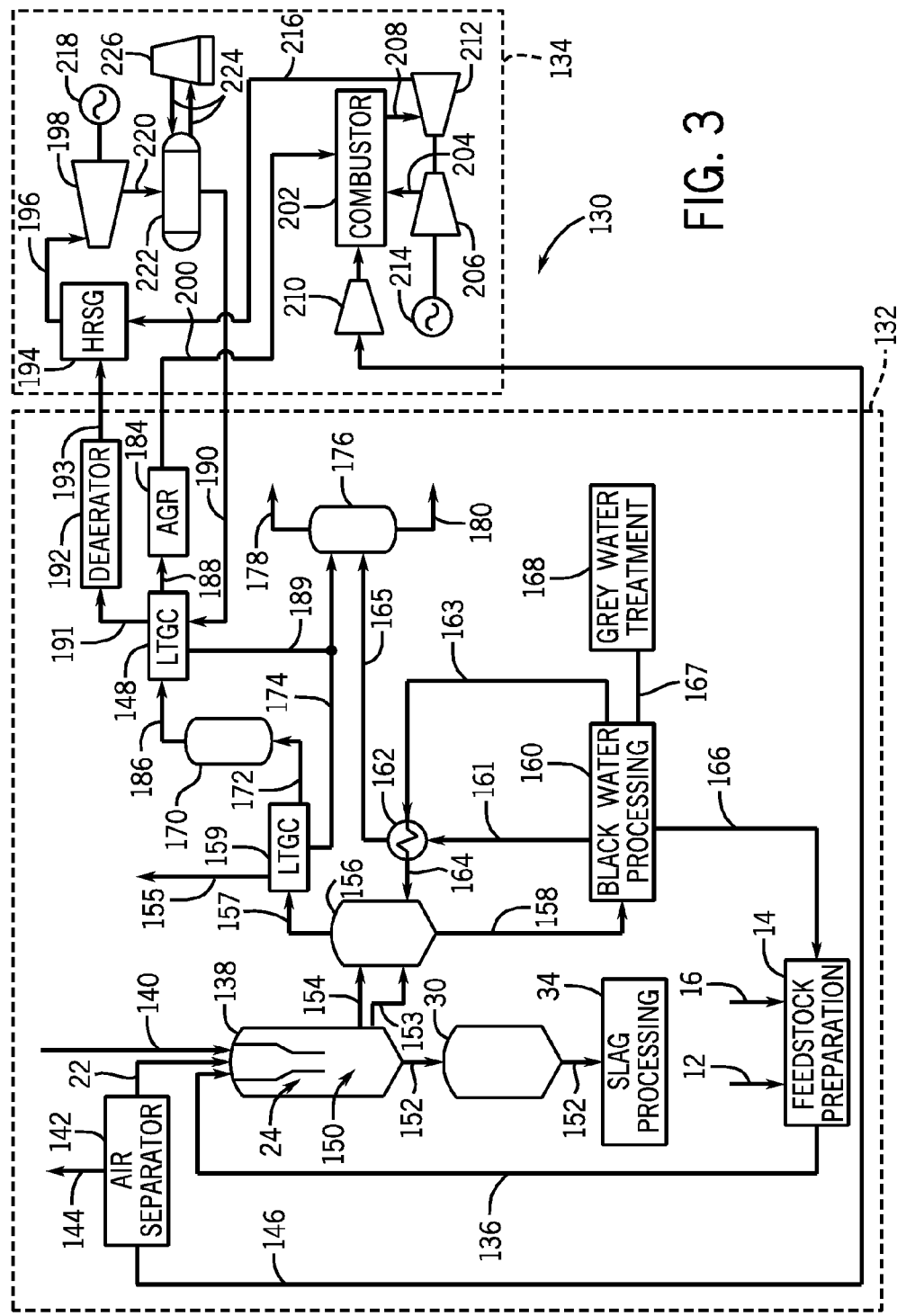
FIG. 3 is a schematic block diagram of an embodiment of an IGCC system.

FIG. 3 illustrates an IGCC system 130 that also may recover heat from a black water flash separation process. The recovery of heat may reduce external heat inputs and/or allow certain process streams to be heated to higher temperatures, thereby increasing the efficiency of the IGCC system 130. The IGCC system 130 includes a gasification system 132 integrated with a power generation system 134. The gasification system 132 includes the feedstock preparation system 14, which may prepare a fuel slurry 136 from the fuel source 12 and the additives 16. From the feedstock preparation system 14, the fuel slurry 136 may be directed to a gasifier 138. The gasifier 138 may include the reaction portion 24 where the fuel slurry 136 may be mixed with the oxygen 22 and steam 140 to produce syngas. The oxygen 22 may be provided by an air separator 142 that separates air 144 into oxygen 22 and nitrogen 146.

The gasifier 138 may be generally similar to the gasifier 20 described above with respect to FIG. 1; however, rather than a quench portion 26, the gasifier 136 may include a cooler 150, such as a radiant syngas cooler. The cooler 150 may be integral with the gasifier 138 or may be a separate unit. Further, in certain embodiments, a convective cooler also may be provided. Within the cooler 150, the syngas may be cooled and saturated, causing less desirable components to solidify. In particular, the molten slag may be rapidly cooled and solidified into slag 152 that may be provided to the slag processing system 34 through the lock hopper 30. During cooling, fine particles of slag also may be removed as black water 153.

In addition to producing slag 152 and black water 153, the cooler 150 produces raw syngas 154. The raw syngas 154 may be directed to a scrubber 156 where fine particles of slag and other entrained gases, such as hydrogen chloride, may be removed as black water 158. The black water 158 may be discharged from the scrubber 156 and directed to a black water processing system 160 while the scrubbed syngas 157 may exit through an upper portion of the scrubber and may be directed to a low temperature gas cooling (LTGC) system 159. In certain embodiments, the black water 153 from the gasifier 138 may be combined with the black water 158 from the scrubber 156.

Figure 4:
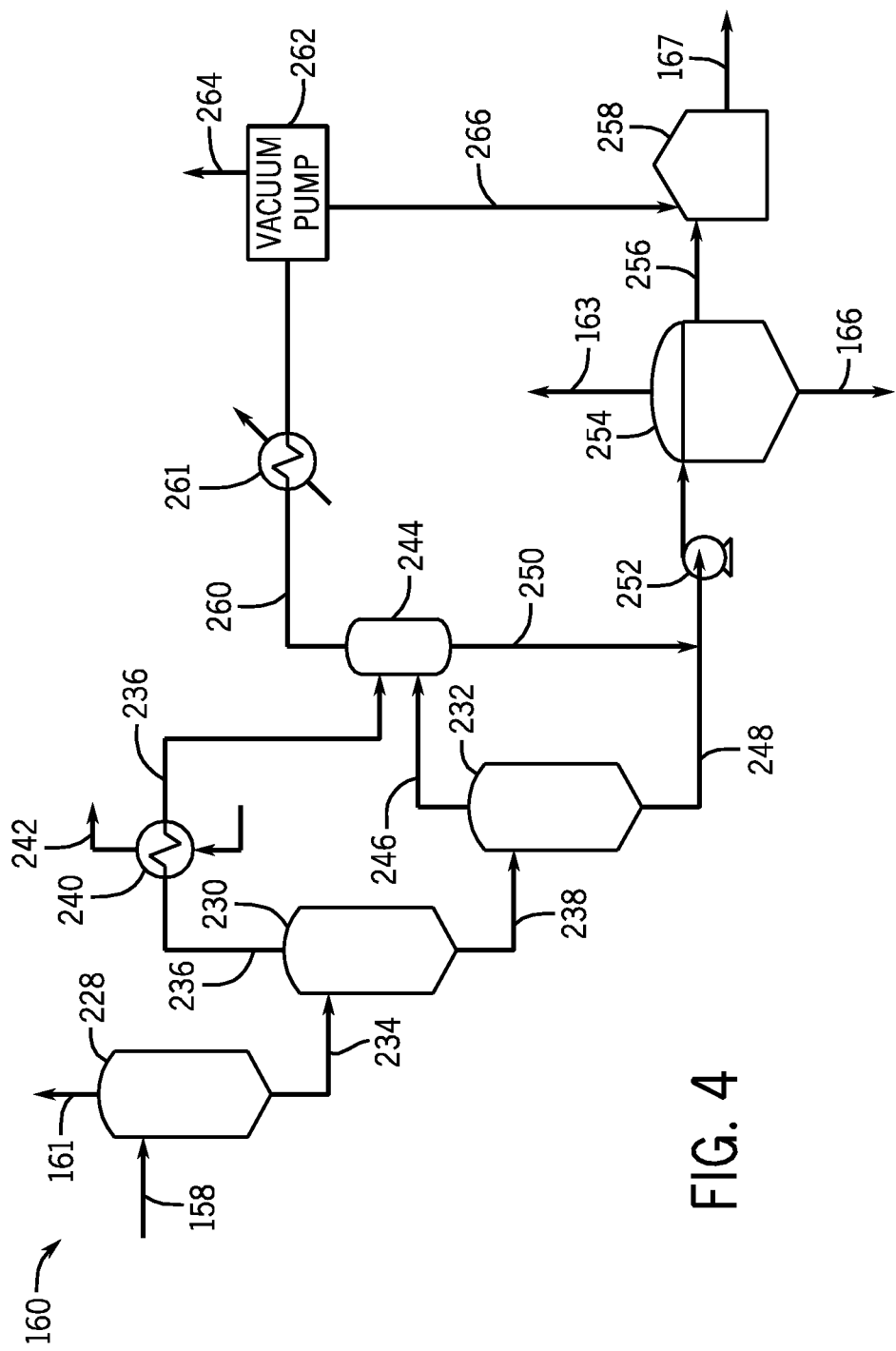
FIG. 4 is a schematic block diagram of an embodiment of the black water processing system of FIG. 3.

As described further with respect to FIG. 4, the black water processing system 160 may include a series of flash tanks that subject the black water 158 to a series of pressure reductions to remove dissolved gases and concentrate the fines. Heat from the flash tanks may be used to heat other streams within the IGCC system 130. Further, overhead flash tank vapor 161 from the black water processing system 160 may be directed to a heat exchanger 162 where the vapor 161 may be used to heat grey water 163 flowing from the black water processing system 160 to the scrubber 156. Within the heat exchanger 162, the grey water 163 may absorb heat from the overhead flash tank vapor 161 to produce heated grey water 164 that may be recycled to the scrubber 156 for further processing. As the overhead flash tank vapor 161 transfers heat to the grey water 163, the overhead flash tank vapor 161 may be cooled to produce cooled vapor 165. The cooled vapor 165 may be directed to a downstream ammonia stripper 176 to facilitate the removal of ammonia within the ammonia stripper 176.

Similar to the black water processing system 46 described above with respect to FIG. 1, the black water processing system 160 may include a settling process that produces separated fines 166 and grey water 167. The separated fines 166 may be recycled to the feed stock preparation system 14 where the fines may be used to provide additional fuel. The grey water 167 may be directed to a grey water treatment system 168 where the grey water 167 may undergo further processing to remove gases, such as ammonia, and solids.

After the black water 158 has been removed in the scrubber 156, the scrubbed syngas 157 may be directed to the LTGC system 159 where the syngas may be cooled and heated in preparation for undergoing carbonyl sulfide (COS) hydrolysis in the COS hydrolysis reactor 170. According to certain embodiments, the LTGC system 159 may include a series of heat exchangers and knock out vessels that cool the scrubbed syngas 157 to produce steam 155. The steam 155 may be sent to the power generation system 134 to produce power via heat recovery steam generation (HRSG) system 194. Further, in certain embodiments, the steam 155 may be used for preheating within the power generation system.

Within the LTGC system 159, as the syngas cools, a portion of the syngas 157 may condense and may be removed as process condensate 174. The process condensate 174 may contain ammonia, and, accordingly, may be directed to an ammonia stripper 176 or to the syngas scrubber 156. Within the ammonia stripper 176, ammonia 178 may be removed from the process condensate 174 as a gas that may be sent to further processing, such as acid gas processing. The remaining condensate 180 may be recycled within the IGCC system 130.

Syngas 172 from the LTGC system 159 may be directed to the COS hydrolysis reactor 170 where carbonyl sulfide within the syngas 172 may be reacted with steam to form hydrogen sulfide and carbon dioxide. The formation of hydrogen sulfide may facilitate the removal of sulfur in a downstream acid gas removal (AGR) system 184.

After undergoing COS hydrolysis within the COS hydrolysis reactor 170, the hydrolyzed syngas 186 may be directed to the LTGC system 148 where additional cooling may occur. According to certain embodiments, the LTGC system 148 may include a series of heat exchangers and knock out vessels that cool the hydrolyzed syngas 186 to produce cooled syngas 188. As the syngas cools, a portion of the syngas 186 may condense and may be removed as process condensate 189. The process condensate 189 may be combined with the process condensate 174 and may be directed to the ammonia stripper 176.

Within the LTGC system 148, heat may be recovered from the hydrolyzed syngas 186. For example, condensed steam 190 from the power generation system 134 may absorb heat from the hydrolyzed syngas 186 to produce heated condensed steam 191, which may be sent to the power generation system 134 to produce power. Prior to entering the power generation system 134, the heated condensed steam 191 may be directed through a deaerator 192 to remove oxygen and other dissolved gases that may cause corrosion in downstream components. The deaerated condensed steam 193 may then be directed to a heat recovery steam generation (HRSG) system 194, which produces superheated steam 196 for powering a steam turbine 198, as discussed further below.

The cooled syngas 188 from the LTGC system 148 may be directed to the acid gas removal system 184, where acid gases, such as hydrogen sulfide, hydrogen chloride, hydrogen fluoride, among others, may be removed to produce sweetened syngas 200. The sweetened syngas 200 may then be used to generate power within the power generation system 134.

Within the power generation system 134, the sweetened syngas 200 may be directed to a combustor 202, where the sweetened syngas 200 may be combusted at a much higher efficiency than the original carbonaceous fuel fed into the feedstock preparation system 14. Air 204 also may be provided to the combustor 202 from a compressor 206 to mix with the syngas 200 in a fuel to air ratio that facilitates combustion of the sweetened syngas 200 to produce combustion gases 208. Nitrogen 146 may be provided to the combustor 202 from the air separator 142 via a diluent nitrogen compressor 210 to cool the combustion reaction for controlling NOx as well as for power augmentation.

The combustion gases 208 from the combustor 202 may be directed to a gas turbine 212, which may drive the compressor 206 and/or an electrical generator 214. Exhaust 216 from the gas turbine 212 may then be directed to the HRSG system 194, which may recover heat from the exhaust 216. The recovered heat may be used to generate the superheated steam 196 from the deaerated condensed steam 193 entering the HRSG system 194. The superheated steam 196 may be used to drive the steam turbine 198, which in turn may drive a generator 218 to generate electricity.

Discharge steam 220 from the steam turbine 198 may then be directed through a condenser 222 where the steam 220 may be condensed to provide the condensed steam 190 that may be heated in the LTGC system 148. To condense the steam 220, a cooling fluid 224, such as water, may be circulated through the condenser 222 from a cooling tower 226. The condensed steam 190 from the condenser 222 may then be heated in the LTGC system 148 and recycled to the HRSG system 194 where the steam may again be heated to generate the steam 196 for the steam turbine 198.

In general, heat from the black water processing system 160 may be recovered and used to heat other streams within the IGCC system 130. For example, as described further below with respect to FIG. 4, heat recovered from the black water processing system 160 may be used to heat fuel slurry 136, grey water 163, and/or condensed steam 190.

FIG. 4 depicts an embodiment of the black water processing system 160 of FIG. 3 that may transfer heat to other areas of the IGCC system 130. The black water processing system 160 includes three flash tanks 228, 230, and 232 arranged in series. Similar to the flash tanks 84, 86, and 90 described above with respect to FIG. 2, each flash tank 228, 230, and 232 may promote separation of fines through a reduction in pressure that causes the black water to be partially evaporated and cooled, thereby separating dissolved gases from the fines. In particular, each flash tank 228, 230, and 232 may subject the black water 158 to a progressively lower pressure, thereby facilitating further removal of dissolved gases at each flash tank 228, 230, and 232.

The black water 158 may enter the black water processing system 160 through the low-pressure flash tank 228. According to certain embodiments, the low-pressure flash tank 228 may operate at a pressure of at least approximately 3 bar. However, in other embodiments, the low-pressure flash tank 228 may operate at any suitable pressure. Within the low-pressure flash tank 228, the vapor components (e.g., the separated gases) may be discharged as overhead vapor 161 through a top portion while a liquid discharge 234 of black water concentrated with fines may exit through a bottom portion. The overhead vapor 161 may be directed through the heat exchanger 162 shown in FIG. 3 to heat the grey water 163 before the grey water 163 enters the scrubber 156.

The liquid discharge 234 from the low-pressure flash tank 228 may enter the lower-pressure flash tank 230 where further separation of the vapor and liquid components may occur. According to certain embodiments, the lower-pressure flash tank 230 may operate at a pressure of approximately 1 bar. After separation within the lower-pressure flash tank 230, the vapor components may be discharged as overhead vapor 236 through a top portion of the lower-pressure flash tank 230 while a liquid discharge 238 of black water concentrated with fines may exit through a bottom portion.

The overhead vapor 236 from the lower-pressure flash tank 230 may flow through a heat exchanger 240 to heat a process stream 242. In particular, as the overhead vapor 236 flows through the heat exchanger 240, the overhead vapor 236 may transfer heat to the process stream 242 flowing through the heat exchanger 240. The process stream 242 may be any suitable stream included within the IGCC system 130. For example, as shown in FIG. 3 and as described further below, the process stream 242 may be the fuel slurry 136 provided to the gasifier 138, the grey water 163 recycled to the scrubber 156, or the condensed steam 190 directed to the LTGC system 148. According to certain embodiments, the process stream 242 may be heated by at least approximately 5, 10, 15, or 20° C. Moreover, the process stream 242 may be heated by at least approximately 5 to 70° C., and all subranges therebetween.

As the overhead vapor 236 flows through the heat exchanger 240, the overhead vapor 236 may be cooled. According to certain embodiments, the overhead vapor 236 may be cooled by at least approximately 1 to 10° C., and all subranges therebetween. The overhead vapor 236 exiting the heat exchanger 240 may be directed to a knock out vessel 244 for separation of the vapor and liquid components.

The liquid discharge 238 from the lower-pressure flash tank 230 may enter the vacuum flash tank 232 where additional separation of the vapor and liquid components may occur. In particular, the vapor components may be discharged as overhead vapor 246 through a top portion of the vacuum flash tank 232 while a liquid discharge 248 of black water concentrated with fines may exit through a bottom portion. The liquid discharge 248 may be combined with liquid components 250 from the knock out vessel 244 and may be directed through a pump 252 to a settling tank 254. Within the settling tank 254, the fines 166 may be separated and provided to the feedstock preparation system 14 for fuel, as described above with respect to FIG. 3. A portion of the remaining liquid may be pumped from the settling tank 254 as the grey water 163 that is recycled to the scrubber 156 as described above with respect to FIG. 3. The remaining liquid 256 and any entrained vapor may be directed to a grey water tank 258 for storage of the grey water 167 prior to direction to the grey water treatment system 168 (FIG. 3). In certain embodiments, the grey water tank 258 may include a motive device for circulating suspended particles and also may serve to regulate flow to the grey water treatment system 168.

The vapor components 260 separated in the knock out vessel 244 may be cooled within a heat exchanger 261 and may then be provided to a vacuum pump system 262. According to certain embodiments, the heat exchanger 261 may circulate cooling fluid, such as cooling water from the cooling tower 226 shown in FIG. 3. The vacuum pump system 262 may include equipment such as pumps, knock out tanks, and heat exchangers that may produce a vacuum in the vacuum flash tank 232. The vacuum pump system 262 also may include one or more knock out tanks that separate vapor 264 from liquid 266. The vapor 264 may exit the vacuum pump system 262 and may be directed to further processing, for example, to a sulfur recovery unit. The liquid 266 may exit the vacuum pump system 262 and may be provided to the grey water tank 258 for further treatment in the grey water treatment system 168 (FIG. 3).

The inclusion of the lower-pressure flash tank 230 and the heat exchanger 240 within the black water processing system 160 may allow heat from the overhead vapor 236 to be used within other parts of the IGCC system 130. In particular, the inclusion of the lower-pressure flash tank 230 may create the overhead vapor 236 that transfers heat to the process stream 242 within the heat exchanger 240. The transfer of heat to the process stream 242 may allow the overhead vapor 236 to be partially cooled before entering the knock out vessel 244. Accordingly, the vapor components 260 exiting the knock out vessel 244 may have a lower temperature, which in turn may reduce the load on the cooling tower that provides cooling water to the heat exchanger 261. According to certain embodiments, the cooling of the overhead vapor 236 in the heat exchanger 240 upstream of the knock out vessel 244 may reduce the circulation of the cooling water by approximately 50,000 to 500,000 pounds per hour, and all subranges therebetween. Further, according to certain embodiments, the load on the cooling tower may be reduced by approximately 1 to 35 percent, and all subranges therebetween.

The transfer of heat from the overhead vapor 236 to the process stream 242 may allow heat to be recovered from the black water processing system 160 and employed in other areas of the IGCC system 130. According to certain embodiments, approximately 3 to 50 MMBtu/h of heat may be recovered from the overhead vapor 236 and transferred to the process stream 242 through the heat exchanger 240. Further, the use of the heat from the overhead vapor 236 in other areas of the IGCC system 130 may lead to reduced energy consumption and/or increased efficiency in other areas of the IGCC system 130.

For example, in embodiments where the process stream 242 is the grey water 163 recycled to the scrubber 156 through the heat exchanger 162 as shown in FIG. 3, the grey water 163 may be preheated before entering the heat exchanger 162. According to certain embodiments, the grey water 163 may be heated by approximately 20° C. as the grey water 163 flows through the heat exchanger 240. The higher temperature grey water 163 entering the heat exchanger 162 may allow less heat to be transferred from the vapor 161 to the grey water 163 in the heat exchanger 162. Accordingly, the cooled vapor 165 exiting the heat exchanger 162 may have a higher temperature, allowing more heat to be provided for ammonia stripping within the stripper 176. The increased heat in the stripper 176 may increase the efficiency of the stripper 176 and/or may reduce the amount of steam provided to the stripper 176.

In another embodiment, the process stream 242 may be the fuel slurry 136 provided to the gasifier 138. In this embodiment, the fuel slurry 136 may be directed through the heat exchanger 240 where the fuel slurry 136 may be heated by approximately 40° C. The preheating of the fuel slurry 136 may increase the temperature of the fuel slurry 136 entering the gasifier 138 which may increase the cold gas efficiency of the gasification process and may decrease consumption of the oxygen 22. Further, the increased temperature of the fuel slurry 136 may decrease the slurry preheating load.

In yet another embodiment, the process stream 242 may be the condensed steam 190 that exits the steam turbine 222 and flows to the LTGC system 148. In this embodiment, the condensed steam 190 may be directed through the heat exchanger 240 to heat the condensed steam 190 by approximately 60° C. The increased temperature of the condensed steam 190 may reduce the load on the steam condensate heater within the LTGC system 148, allowing more steam to be produced.

In other embodiments, the number and/or the types of flash tanks 228, 230, and 232 included in the black water processing system 160 may vary. For example, in certain embodiments, four flash tanks (e.g., a low-pressure flash tank, two low-pressure flash tanks, and a vacuum flash tank) may be included. Moreover, multiple heat exchangers in series and/or in parallel may be employed to transfer heat from the overhead vapor 236 to the process stream 242. Further, additional equipment, such as pumps, valves, temperature sensors, and pressure transducers, among others, may be included.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gasification system, comprising:
a gasifier configured to produce a black water and syngas from a fuel source;
a black water processing system fluidly coupled to the gasifier via a first flow path, wherein the black water processing system is configured to produce a grey water stream from the black water, and the black water processing system comprises:
a first flash tank disposed along the first flow path and downstream from the gasifier, wherein the first flash tank is configured to separate gases from the black water to produce a first discharge of the black water and a second discharge of first separated gases; and
a second flash tank disposed along the first flow path downstream of and in series with the first flash tank, wherein the second flash tank is configured to separate gases from the first discharge of the black water to produce a third discharge of the black water and a fourth discharge of second separated gases; and
a deaerator fluidly coupled to the black water processing system via the first flow path, wherein the deaerator is configured to receive and remove gases from the grey water stream produced by the black water processing system; and
an indirect heat exchanger configured to transfer heat from the fourth discharge to a process stream of the gasification system, wherein the process stream comprises a makeup water stream for the deaerator or the grey water stream flowing from the black water processing system to the deaerator.

2. The gasification system of claim 1, comprising a vacuum pump system configured to create a vacuum within the second flash tank.

3. The gasification system of claim 1, comprising a vacuum flash tank disposed along the first flow path downstream of and in series with the second flash tank, wherein the vacuum flash tank is configured to separate gases from the third discharge of the black water to produce a fifth discharge of the black water and a sixth discharge of third separated gases.

4. The gasification system of claim 1, comprising another heat exchanger configured to transfer heat from the second discharge to grey water entering a scrubber.

5. A gasification system, comprising:
a gasifier configured to produce a black water and syngas from a fuel source;
a black water processing system fluidly coupled to the gasifier via a first flow path, wherein the black water processing system comprises:
a first flash tank configured to separate gases from black water to produce a first discharge of the black water and a second discharge of first separated gases;
a second flash tank configured to separate the gases from the first discharge to produce a third discharge of the black water and a fourth discharge of second separated gases;
a vacuum flash tank configured to separate the gases from the third discharge to produce a fifth discharge of the black water and a sixth discharge of third separated gases; and
a knock out vessel fluidly coupled to the second flash tank and the vacuum flash tank via a second flow path configured to flow the fourth discharge of second separated gases and a third flow path configured to flow the sixth discharge of third separated gases, respectively; and
an indirect heat exchanger configured to transfer heat from the fourth discharge to a process stream of the gasification system, wherein the process stream comprises at least one of: a fuel slurry stream flowing from a feedstock preparation system to the gasifier, a makeup water stream for a deaerator, a grey water stream flowing from a black water processing system to the deaerator, or a fine particle slag stream flowing from a black water processing system to the feedstock preparation system.

6. The gasification system of claim 5, comprising the feedstock preparation system, wherein the process stream comprises the fuel slurry stream flowing from the feedstock preparation system to the gasifier.

7. The gasification system of claim 5, comprising a scrubber fluidly coupled to the gasifier via a fourth flow path, and an additional heat exchanger disposed along a fifth flow path fluidly coupling the deaerator to the scrubber, wherein the additional heat exchanger is configured to transfer heat from the second discharge to a grey water stream flowing from the deaerator to the scrubber, and wherein the fourth flow path fluidly couples the scrubber to the first flow path such that additional black water generated by the scrubber comprises at least a portion of the black water received by the black water processing system.

8. The gasification system of claim 5, wherein the gasification system is configured to direct the syngas to a power generation system.

9. The gasification system of claim 1, wherein the process stream comprises the makeup water stream for the deaerator.

10. The gasification system of claim 1, wherein the process stream comprises the grey water stream flowing from the black water processing system to the deaerator.

11. The gasification system of claim 1, comprising a scrubber fluidly coupled to the gasifier via a second flow path, wherein the scrubber is configured to scrub the syngas produced in the gasifier to generate additional black water and a scrubbed syngas, wherein the second flow path fluidly couples the scrubber to the first flow path such that the additional black water comprises at least a portion of the black water received by the black water processing system.

12. The gasification system of claim 11, comprising an additional heat exchanger disposed along a third flow path fluidly coupling the deaerator to the scrubber, wherein the additional heat exchanger is configured to transfer heat from the second discharge to a deaerated grey water stream flowing from the deaerator to the scrubber.

13. The gasification system of claim 3, comprising a knock out vessel fluidly coupled to the second flash tank and the vacuum flash tank via a second flow path configured to flow the fourth discharge of second separated gases and a third flow path configured to flow the sixth discharge of third separated gases, respectively.

14. The gasification system of claim 13, wherein the indirect heat exchanger is disposed along the second flow path between the second flash tank and the knock out vessel.

15. The gasification system of claim 5, comprising the deaerator, wherein the deaerator is fluidly coupled to the black water processing system via the first flow path, and the deaerator is configured to receive and remove gases from the grey water stream flowing from the black water processing system, and wherein the process stream comprises the makeup water stream for the deaerator or the grey water stream flowing from the black water processing system to the deaerator.

16. A method, comprising:
receiving a black water from a gasifier, a scrubber, or a combination thereof, with a black water processing system;
separating gases from the black water to produce a first discharge of the black water and a second discharge of first separated gases with a first flash vessel of the black water processing system;
separating gases from the first discharge of the black water to produce a third discharge of the black water and a fourth discharge of second separated gases with a second flash vessel of the black water processing system;
separating the gases from the third discharge to produce a fifth discharge of the black water and a sixth discharge of third separated gases with a vacuum flash vessel of the black water processing system;
separating liquid and vapor components of the second separated gases and the third separated gases to produce a liquid component discharge and a vapor component discharge with a knock out vessel of the black water processing system; and
indirectly exchanging heat between the fourth discharge and a process stream of a gasification system having the gasifier and the black water processing system.

17. The method of claim 16, wherein indirectly exchanging heat between the fourth discharge and the process stream of the gasification system comprises indirectly exchanging heat between the fourth discharge and a makeup water stream for a deaerator or a grey water stream flowing from the black water processing system to the deaerator.

18. The method of claim 16, wherein indirectly exchanging heat between the fourth discharge and the process stream of the gasification system comprises indirectly exchanging heat between the fourth discharge and a fuel slurry stream flowing from a feedstock preparation system to the gasifier.

19. The method of claim 16, wherein indirectly exchanging heat between the fourth discharge and the process stream of the gasification system comprises indirectly exchanging heat between the fourth discharge and a fine particle slag stream flowing from the black water processing system to a feedstock preparation system.

* * * * *